United States Patent Office 3,208,961
Patented Sept. 28, 1965

3,208,961
IN SITU CATALYST FORMING COMPOSITIONS AND PROCESS
Gust J. Kookootsedes, Midland, Mich., assignor to Dow Corning Corporation, Midland, Mich., a corporation of Michigan
No Drawing. Filed May 13, 1963, Ser. No. 280,133
19 Claims. (Cl. 260—18)

This invention relates to improved silicone molding compositions. More particularly this invention relates to silicone compositions especially adapted to transfer molding techniques.

In preparing silicone resin molding compositions one needs to blend the resin, filler and catalyst. Since silicone resins are generally hard and brittle at room temperature it is necessary to heat the resin while the filler and catalyst are being mixed therewith. This will render the resin sufficiently soft that the ingredients can be uniformly blended.

It has been known for some time that lead salts of carboxylic acids are good catalysts for siloxane resins. This is especially true for resins which are employed in solvent. Here one can add the catalyst to the resin solution at room temperature. However, attempts to use these excellent catalysts in solvent free silicone molding compounds have been unsuccessful because they often cause gelation of the resin during mixing.

In addition, the heretofore employed lead catalyst are not desirable for use in transfer molding because they often cause the resin to gel between the pot and the mold. This causes insufficient flow and prevents satisfactory moldings from being formed.

The primary object of this invention is to provide a catalyzed silicone resin molding composition which can be prepared by hot mixing the resin, filler and catalyst and which has sufficient flow for use in transfer molding and yet will cure rapidly in the mold to give a hard molded article. Another object is to prepare compositions which can be employed in compression molding application.

This invention relates to a composition consisting essentially of a phenylsiloxane resin, a filler and a catalytic amount of a catalyst combination which consists essentially of a lead compound selected from the group consisting of lead monoxide and lead carbonate and a compound selected from the group consisting of carboxylic acids and the ammonium salts of carboxylic acids.

The lead monoxide used in the catalyst composition can be any of the well known forms. It is preferred, however, that the red crystalline form be employed. The particle size of the lead monoxide or lead carbonate that is used can vary over a wide range. For example, in commercially available lead monoxides the size of the particles are from about 1 to 200 microns. It is preferably, however, that the majority of the particles of the lead monoxide employed have a particle size in the range of 5 to 15 microns. Lead monoxides having particle sizes larger or smaller than the commercially available materials can be used but are not preferred. Other lead oxides such as $Pb_3O_4$ and $PbO_2$ are not operable in the compositions of this invention.

Any carboxylic acids can be used in the catalyst composition of this invention. Examples of suitable acids are resin acids, linoleic acid, stearic acid, oleic acid, acetic acid, butyric acid, naphthenic acid, octoic acid, benzoic acid, 2-ethylhexanoic acid, lauric acid and palmitic acid. Any ammonium salt of a carboxylic acid can also be employed. Specific examples of suitable ammonium salts are ammonium acetate, ammonium laurate, ammonium oleate, ammonium palmitate, ammonium benzoate and ammonium stearate. Of the above materials, acetic and stearic acids and the ammonium salts thereof are the preferred compounds.

It is not possible to put meaningful numerical limitations on the relative amounts of the two ingredients in the catalyst combination as this will vary with the particular use to which the molding composition is put. Generally speaking, however, the mole ratio of the lead compound to the acid or acid salt should not be below 1:0.5 and is preferably at least 1:1. That is to say, there should not be present less than 0.5 mole of the acid or acid salt for each mole of the lead compound in the catalyst composition and preferably there is at least one mole of the acid or acid salt for each mole of the lead compound present. There is no known upper limit as to the excess of acid or acid salt that can be employed and it is known that in some instances, for example, that at least 7 moles of the acid salt per mole of lead compound can be used with excellent results.

The phenylsiloxane resins that can be used in the composition of this invention are well known materials. These resins are copolymers containing at least two different types of siloxane units at least one type of said units containing a phenyl group. For example, siloxane units that can be present in the phenylsiloxane resins are $C_6H_5SiO_{3/2}$, $(C_6H_5)_2SiO$, $CH_3SiO_{3/2}$, $(CH_3)_2SiO$
$(CH_3)C_6H_5SiO$, $C_2H_5SiO_{3/2}$, $(C_2H_5)_2SiO$
$(C_2H_5)C_6H_5SiO$, $C_3H_7SiO_{3/2}$, $(C_3H_7)_2SiO$
$(C_3H_7)C_6H_5SiO$, $CH_2\!=\!CHSiO_{3/2}$, $(CH_2\!=\!CH)CH_3SiO$
$CH_2\!=\!CHCH_2SiO_{3/2}$
$(CF_3CH_2CH_2)CH_3SiO$, $ClCH_2CH_2CH_2SiO_{3/2}$
$C_6H_{11}SiO_{3/2}$, $Cl_2C_6H_3SiO_{3/2}$, $CF_3C_6H_4SiO_{3/2}$
$(C_6H_5)CF_3CH_2CH_2SiO$, $CH_3C_6H_4SiO_{3/2}$ and
$C_6H_5CH_2SiO_{3/2}$ As can be seen from the foregoing examples, any monovalent hydrocarbon or halogenated hydrocarbon group can be present in the resins along with the phenyl group. The phenylsiloxane resins employed in this invention must have a phenyl to silicon ratio in the range of .3:1 to .9:1. The ratio of the other monovalent hydrocarbon or halogenated hydrocarbon groups present to silicon must be in the range of .4:1 to 1.2:1. The total ratio of the phenyl and other substituents to the silicon must be in the range of 1:1 to 1.7:1. Preferably, the resin has a phenyl to silicon ratio of .5:1 to .7:1, and other substituents to silicon ratio of .5:1 to 1:1 and a total phenyl and other substituents ratio of 1.1:1 to 1.6:1. The preferred resins of this invention are phenylmethylsiloxane resins, that is, resins containing siloxane units containing phenyl and/or methyl groups. The symbol R is employed herein to represent monovalent hydrocarbon and halogenated monovalent hydrocarbon groups. In addition, the resins must contain at least 0.25 percent by weight of silicon-bonded OH groups. The resin can contain up to several percent, say, for example, about 6 percent OH groups but only the minimum amount of OH groups present is of real importance. In addition to the OH groups the resins can contain some alkoxy groups, such as the methoxy, ethoxy and isopropoxy groups, but the presence of such groups is not essential to the invention as is the presence of the OH groups.

The particular filler employed in the composition of this invention is not critical and numerous fillers that can be used will be immediately obvious to those skilled in the art. A few of the numerous suitable fillers one might mention are glass, diatomaceous earth, crushed quartz, clays, fume silica, precipitated silica, zirconium silicate, magnesium silicate, lithium silicate, aluminum silicate, etc. In addtion very small amounts of iron oxide, magnesium oxide, titanium dioxide and calcium carbonate can also be used.

The relative amounts of the resin and filler in the composition of this invention are not critical. For example, the amount of filler can be a small fraction of the amount of resin present or the amount of filler can be several times the amount of the resin present. The relative amounts of resin and filler to be employed is dependent on the use to be made of the composition or the properties desired in an article made from the composition and by varying the relative proportions of these two ingredients one can obtain a wide variety of properties. This, of course, is obvious to those skilled in the art.

With respect to the total amount of the catalyst to be employed, it is likewise impossible to specify any meaningful numerical figures. The optimum amount relative to the amount of resin to be employed will vary from one instance to another and must be determined for each instance individually. This, however, is easily done and is in in fact advantageous since it allows flexibility in the use of the composition to meet various individual needs instead of having to try and make individual needs (usually unsuccessfully) fit a rigid pattern. For example, in molding applications where different degrees of flow are required, this can be regulated to fit the particular need by utilizing more or less of the catalyst composition in the formulation or by using a combination of catalysts.

The order in which the ingredients of the catalyst combination are added to the resin is not critical. Either can be added first or they can be added simultaneously. Also, if so desired, the catalyst ingredients can be mixed with a small amount of filler prior to being added to the bulk of the resin-filler mixture.

In addition to the above ingredients, small amounts of conventional additives can be included in the composition. For example, release agents such as calcium or aluminum stearate, pigments such as iron oxides or carbon black, preservatives, etc. can also be employed in the composition.

In order that those skilled in the art may better understand how the present invention can be practiced, the following examples are given by way of illustration and not by way of limitation.

All parts and percents referred to in the examples and specification are on a weight basis unless otherwise specified.

EXAMPLE 1

200 parts of a phenylmethylsiloxane resin having a $CH_3$:Si ratio of .50:1, a $C_6H_5$:Si ratio of .65:1, a total phenyl plus methyl:Si ratio of 1.15:1 and at least 0.25 percent silicon-bonded OH groups, 590 parts of a fused silica filler, 8 parts of a black pigment and 2 parts of calcium stearate (a release agent) were dry mixed and then added to a two roll mill with one roll at about 200° F. and the other roll at about 40° F. The total time from the start of the addition of the mixture to the mill until the addition of the catalyst was 5 minutes. Then the catalyst composition was added and the mixture milled for an additional 3 minutes.

By way of illustration, the various compositions prepared as indicated above were subjected to the spiral flow test. This test indicates how far a material will flow under heat and pressure before the resin gels. This test simulates the use of the composition of transfer molding. The following procedure was employed in the flow test. A 50 gram sample of the composition to be tested was preformed into a 2-inch slug under 10 tons gauge pressure. The preformed slug was then placed in the flow tester mold and molded for one minute at 350° F. at the pressure indicated in the table. The mold was then opened and the flow of the composition measured in inches.

In each of the catalyst compositions of this example, the percent of lead (calculated as lead metal) was held constant to make the compositions comparative. The various catalyst compositions used and the test results are set forth in the table below.

| | Catalyst | Parts | Molding Pressure (p.s.i.) | Spiral Flow (inches) |
|---|---|---|---|---|
| 1 | Lead stearate [1] | 5.2 | | |
| 2 | Lead monoxide / Ammonium stearate | 1.51 / 2.04 | 800 | 4.5 |
| 3 | Lead carbonate / Ammonium stearate | 1.8 / 6.12 | 251 | 9.5 |
| 4 | Lead carbonate / Ammonium acetate | 1.8 / 1.5 | 251 | 6.25 |
| 5 | Lead carbonate / Ammonium acetate | 1.8 / 2.25 | 251 | 5 |
| 6 | Lead carbonate / Ammonium acetate | 1.8 / 3.75 | 800 | 8.5 |
| 7 | Lead monoxide / Ammonium acetate | 1.51 / .75 | 10,000 | 4 |
| 8 | Lead monoxide / Acetic acid | 1.51 / .59 | 2,400 | 12 |

[1] This compound is so active it caused the composition to gel on the mill 1¼ minutes after it was added.

Each of the spirals formed above using the catalyst composition of this invention were hard and blister-free whereas the lead stearate per se could not even be mixed into the molding composition and used as a catalyst as it caused the mixture to set up on the mill.

EXAMPLE 2

200 parts of a phenylmethylsiloxane resin having a $CH_3$:Si ratio of .72:1, a $C_6H_5$:Si ratio of .60:1, a total phenyl plus methyl:Si ratio of 1.32:1 and at least 0.25 percent silicon-bonded OH groups, 400 parts of a hammer milled glass, 190 parts of fused silica filler, 8 parts of a black pigment and 2 parts of aluminum stearate (a release agent) were dry mixed and then added to a two roll mill with one roll at about 100° F. and the other roll at about 40° F. About 5 minutes were required to get the mixture on the mill and banded. Then the catalyst composition consisting of 6.45 parts of lead carbonate and 4.9 parts of ammonium stearate was added and the mixture milled for an additional 5 minutes. The composition was subjected to the spiral flow test as in Example 1, employing a molding time of 3 minutes and a molding pressure of 800 p.s.i. The composition had a flow of 15 inches and the spiral formed was hard and blister-free.

EXAMPLE 3

200 parts of a phenylmethylsiloxane resin having a $CH_3$:Si ratio of .72:1, a $C_6H_5$:Si ratio of .60:1, a total phenyl plus methyl:Si ratio of 1.32:1 and at least 0.25 percent silicon-bonded OH groups, 400 parts of a hammer milled glass, 190 parts of fused silica filler, 8 parts of a black pigment and 2 parts of calcium stearate (a release agent) were dry mixed and then added to a two roll mill with one roll at about 100° F. and the other roll at about 40° F. About 6 minutes were required to get the mixture on the mill and banded. Then the catalyst composition consisting of 1.51 parts of lead monoxide and 2.04 parts of ammonium stearate was added and the mixture milled for an additional 3 minutes. The composition was subjected to the spiral flow test as in Example 1, employing a molding time of 3 minutes and a molding pressure of 2400 p.s.i. The composition had a flow of 7 inches and the spiral formed was hard and blister-free.

EXAMPLE 4

This example shows that the compositions of this invention are also suitable for use in compression molding. 46 gram samples of compositions 2, 5 and 6 set forth in Example 1 were weighed out and poured into a 4 inch disk mold and molded for 3 minutes at 330° F. and under 8 tons gauge pressure. The disks thus formed are about ⅛ inch thick and 4 inches in diameter. The disks formed from the three compositions were all hard and blister-free.

EXAMPLE 5

Tests have shown that when transfer molding around diodes with a composition containing a phenylmethylsiloxane resin having a $CH_3$:Si ratio of .5:1, a $C_6H_5$:Si ratio of .65:1, a total phenyl plus methyl:Si ratio of 1.15:1 and at least 0.25 percent silicon-bonded OH groups that the molding time can be cut from 3 minutes to 1 minute when a mixture of lead carbonate and ammonium acetate or a mixture of lead monoxide and ammonium stearate is used as the catalyst.

EXAMPLE 6

When a mixture consisting essentially of 200 parts of a phenylmethylsiloxane resin having a $CH_3$:Si ratio of 1.1:1, a $C_6H_5$:Si ratio of .3:1, a total phenyl plus methyl:Si ratio of 1.4:1 and at least 0.25 percent silicon-bonded OH groups, 340 parts of diatomaceous earth filler and any one of the catalyst compositions in the table below is employed as a molding composition, good results are obtained.

*Catalyst compositions*

| | Parts |
|---|---|
| (A) | |
| Lead carbonate | 3.5 |
| Acetic acid | 2.7 |
| (B) | |
| Lead carbonate | 2.15 |
| Stearic acid | 2.27 |
| (C) | |
| Lead monoxide | 4.3 |
| Ammonium oleate-oleic acid mixture | 5.85 |

EXAMPLE 7

When a mixture consisting essentially of 500 parts of a phenylmethylsiloxane resin having a $CH_3$:Si ratio of .9:1, a $C_6H_5$:Si ratio of .4:1, a total phenyl plus methyl:Si ratio of 1.3:1 and at least 0.25 percent silicon-bonded OH groups, 1,485 parts of titanium dioxide filler and any one of the catalyst compositions in the table below is employed as a molding composition, good results are obtained.

*Catalyst composition*

| | Parts |
|---|---|
| (A) | |
| Lead monoxide | 22.3 |
| 2-ethylhexanoic acid | 19 |
| (B) | |
| Lead monoxide | 11.15 |
| Stearic acid | 14.2 |

EXAMPLE 8

When a mixture of 255 parts of a phenylmethylsiloxane resin having a $CH_3$:Si ratio of .95:1, a $C_6H_5$:Si ratio of .55:1, a total phenyl plus methyl:Si ratio of 1.5:1 and at least 0.25 percent silicon-bonded OH groups, 1230 parts of a magnesium silicate, 15 parts of calcium stearate, 3 parts lead monoxide, 3 parts ammonium stearate and 1 part ammonium palmitate is employed as a molding composition, good results are obtained.

EXAMPLE 9

Tests have shown that in the molding of bobbins using a molding compound containing a phenylsiloxane resin, the molding time can be cut from 5 minutes to 2 to 3 minutes using a mixture of lead carbonate and ammonium acetate as the catalyst.

EXAMPLE 10

When any of the following R groups are substituted for all or part of the methyl groups in the resin of Example 1, equivalent results are obtained: $C_2H_5-$, $C_5H_{11}$, $C_8H_{17}-$, $C_{10}H_{21}-$, $C_{18}H_{37}-$, $CH_2=CH-$, $CH_2=CHCH_2-$, $C_6H_{11}-$, $C_6H_9-$, $C_6H_5C_6H_4-$, $CH_3C_6H_4-$, $C_6H_5CH_2-$, $Cl(CH_2)_3-$, $CF_3C_6H_4-$, $Cl_2C_6H_3-$ or $CF_3CH_2CH_2-$.

That which is claimed is:

1. A composition consisting essentially of a phenylsiloxane resin having a $C_6H_5$:Si ratio of .3:1 to .9:1, an R:Si ratio of .4:1 to 1.2:1, R being a member selected from the group consisting of monovalent hydrocarbon and halogenated monovalent hydrocarbon groups, a total phenyl plus R:Si ratio of 1:1 to 1.7:1 and containing at least 0.25 percent by weight of silicon-bonded OH groups, a filler and a catalytic amount of a catalyst combination which consists essentially of a lead compound selected from the group consisting of lead monoxide and lead carbonate and a compound selected from the group consisting of carboxylic acids and the ammonium salts of carboxylic acids.

2. The composition of claim 1 wherein the phenylsiloxane resin has a $C_6H_5$:Si ratio of .5:1 to .7:1, an R:Si ratio of .5:1 to 1:1 and a total phenyl plus R:Si ratio of 1.1:1 to 1.6:1.

3. The composition of claim 2 wherein the resin is a phenylmethylsiloxane resin.

4. The composition of claim 3 wherein the catalyst combination consists essentially of lead monoxide and a carboxylic acid.

5. The composition of claim 4 wherein the carboxylic acid is acetic acid.

6. The composition of claim 4 wherein the carboxylic acid is stearic acid.

7. The composition of claim 3 wherein the catalyst combination consists essentially of lead monoxide and the ammonium salt of a carboxylic acid.

8. The composition of claim 7 wherein the salt is ammonium acetate.

9. The composition of claim 7 wherein the salt is ammonium stearate.

10. The composition of claim 3 wherein the catalyst combination consists essentially of lead carbonate and a carboxylic acid.

11. The composition of claim 10 wherein the carboxylic acid is acetic acid.

12. The composition of claim 10 wherein the carboxylic acid is stearic acid.

13. The composition of claim 3 wherein the catalyst combination consists essentially of lead carbonate and the ammonium salt of a carboxylic acid.

14. The composition of claim 13 wherein the salt is ammonium acetate.

15. The composition of claim 13 wherein the salt is ammonium stearate.

16. The composition of claim 4 wherein the carboxylic acid is benzoic acid.

17. The composition of claim 7 wherein the salt is ammonium benzoate.

18. The composition of claim 10 wherein the carboxylic acid is benzoic acid.

19. The composition of claim 13 wherein the salt is ammonium benzoate.

References Cited by the Examiner

UNITED STATES PATENTS

| 2,410,737 | 11/46 | Jenny | 260—37 |
| 2,516,047 | 7/50 | De Coste | 260—46.5 |
| 3,070,559 | 12/62 | Nitzsche et al. | 260—18 |
| 3,070,566 | 12/62 | Nitzsche et al. | 260—46.5 |
| 3,094,497 | 7/63 | Hyde | 260—46.5 |

LEON J. BERCOVITZ, *Primary Examiner.*

SAMUEL H. BLECH, *Examiner.*